(12) United States Patent
Yankovec

(10) Patent No.: US 11,977,691 B1
(45) Date of Patent: May 7, 2024

(54) TOUCH SCREEN ACTUATION ASSIST ASSEMBLY

(71) Applicant: Joseph Yankovec, Mesa, AZ (US)

(72) Inventor: Joseph Yankovec, Mesa, AZ (US)

( * ) Notice: Subject to any disclaimer, the term of this patent is extended or adjusted under 35 U.S.C. 154(b) by 0 days.

(21) Appl. No.: 18/142,278

(22) Filed: May 2, 2023

(51) Int. Cl.
*G06F 3/0354* (2013.01)

(52) U.S. Cl.
CPC .. *G06F 3/03545* (2013.01); *G06F 2203/0331* (2013.01)

(58) Field of Classification Search
None
See application file for complete search history.

(56) References Cited

U.S. PATENT DOCUMENTS

| | | | |
|---|---|---|---|
| D418,494 S | 1/2000 | Robb | |
| D440,570 S | 4/2001 | Schneider | |
| 8,730,194 B2 | 5/2014 | Vellanki | |
| 9,352,462 B2* | 5/2016 | Laybourne | B43K 23/012 |
| 10,433,629 B2 | 10/2019 | Atlas | |
| 10,466,812 B2 | 11/2019 | Grossman | |
| 11,500,479 B2 | 11/2022 | Hines | |
| 2001/0053306 A1* | 12/2001 | Schneider | B43K 23/012 |
| | | | 401/258 |
| 2004/0150616 A1* | 8/2004 | Murphy | G06F 3/03545 |
| | | | 345/156 |
| 2005/0093835 A1* | 5/2005 | Mortarelli | G06F 3/03545 |
| | | | 345/179 |
| 2006/0066563 A1* | 3/2006 | Mochwart | G06F 3/03545 |
| | | | 345/156 |
| 2008/0106521 A1* | 5/2008 | Nave | G06F 3/03545 |
| | | | 345/173 |
| 2008/0297493 A1* | 12/2008 | Adkins | G06F 3/03545 |
| | | | 345/179 |
| 2009/0078478 A1 | 3/2009 | Newman | |
| 2010/0065343 A1* | 3/2010 | Liu | G06F 3/03545 |
| | | | 178/19.01 |
| 2010/0188326 A1* | 7/2010 | Dines | G06F 3/033 |
| | | | 345/156 |
| 2012/0170962 A1* | 7/2012 | Nwapa-Jourdan | B43K 23/012 |
| | | | 401/8 |
| 2013/0076690 A1* | 3/2013 | Vellanki | G06F 3/0393 |
| | | | 345/174 |
| 2015/0091879 A1* | 4/2015 | Madsen | G06F 3/0393 |
| | | | 345/179 |
| 2016/0209943 A1* | 7/2016 | Yu | G06F 3/0445 |

(Continued)

FOREIGN PATENT DOCUMENTS

WO  WO2019135969  7/2019

*Primary Examiner* — Amare Mengistu
*Assistant Examiner* — Sarvesh J Nadkarni

(57) ABSTRACT

A touch screen actuation assist assembly for mounting a stylus to a finger such that the stylus facilitates actuating a touch screen includes a mount removable engaging to a finger adjacent to a free end of the finger. The mount includes a perimeter wall having an exterior surface, an interior surface, an outer edge, and an inner edge. The outer and inner edges define openings for extending the finger through. An elongated member is attached to the mount adjacent to the outer edge and extends away from the outer edge. The elongated member has a distal end relative to the mount. A stylus is coupled to the elongated member adjacent to the distal end. The stylus includes a material actuating a touch screen of a personal electronic device.

6 Claims, 6 Drawing Sheets

(56) References Cited

U.S. PATENT DOCUMENTS

| | | | |
|---|---|---|---|
| 2017/0031469 A1* | 2/2017 | Grossman | G06F 3/0383 |
| 2017/0364151 A1* | 12/2017 | Huang | G06F 3/017 |
| 2019/0113989 A1* | 4/2019 | Giese | G06F 3/04883 |
| 2019/0200723 A1* | 7/2019 | Atlas | G06F 3/0488 |
| 2022/0221947 A1* | 7/2022 | Hines | G06F 3/0393 |

* cited by examiner

TOUCH SCREEN ACTUATION ASSIST ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to touch screen actuators and more particularly pertains to a new touch screen actuator for mounting a stylus to a finger to facilitate actuating a touch screen when the finger engages with the touch screen.

(2) Description of Related Art Including Information Disclosed Under 37 CFR 1.97 and 1.98

The prior art relates to touch screen actuators and includes a variety of touch screen actuators being mountable to a finger. Known prior art does not include a touch screen actuator including a stylus being mounted to a finger for extension away from the finger.

BRIEF SUMMARY OF THE INVENTION

An embodiment of the disclosure meets the needs presented above by generally comprising a mount configured for removable engagement to a finger adjacent to a free end of the finger. The mount includes a perimeter wall having an exterior surface, an interior surface, an outer edge, and an inner edge. The outer and inner edges define openings for extending the finger through. An elongated member is coupled to the mount adjacent to the outer edge and extends away from the outer edge. The elongated member has a distal end relative to the mount. A stylus is coupled to the elongated member adjacent to the distal end. The stylus comprises a material configured to actuate a touch screen of a personal electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
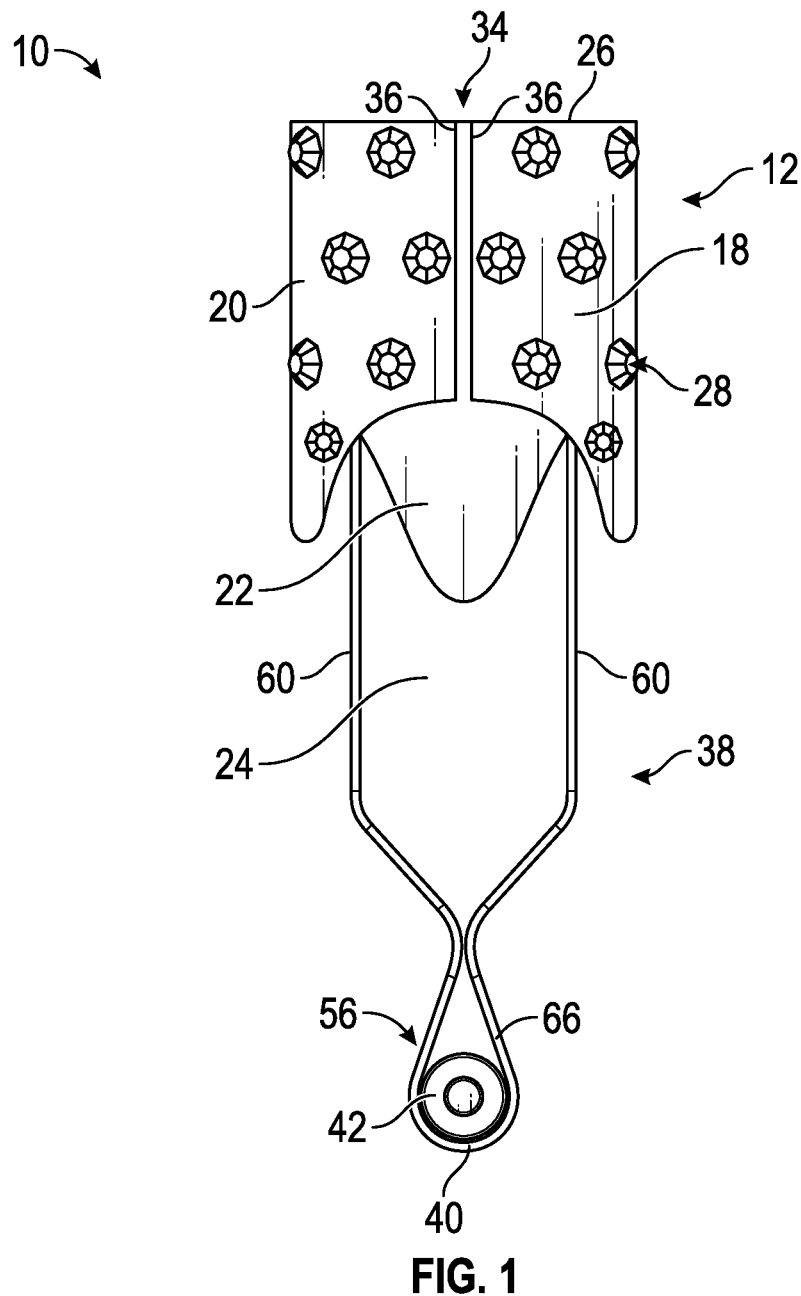
FIG. 1 is a front view of a touch screen actuation assist assembly according to an embodiment of the disclosure.
Figure 2:
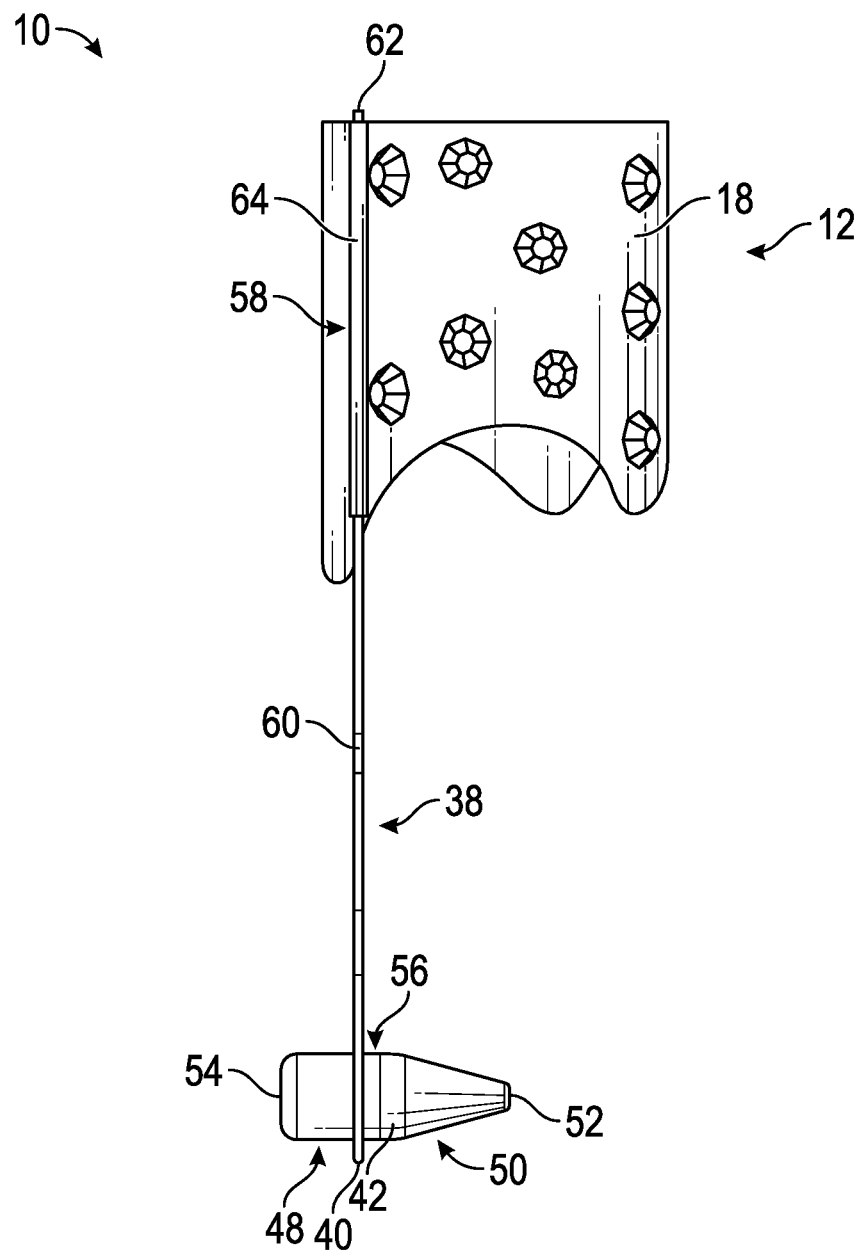
FIG. 2 is a side view of an embodiment of the disclosure.
Figure 3:
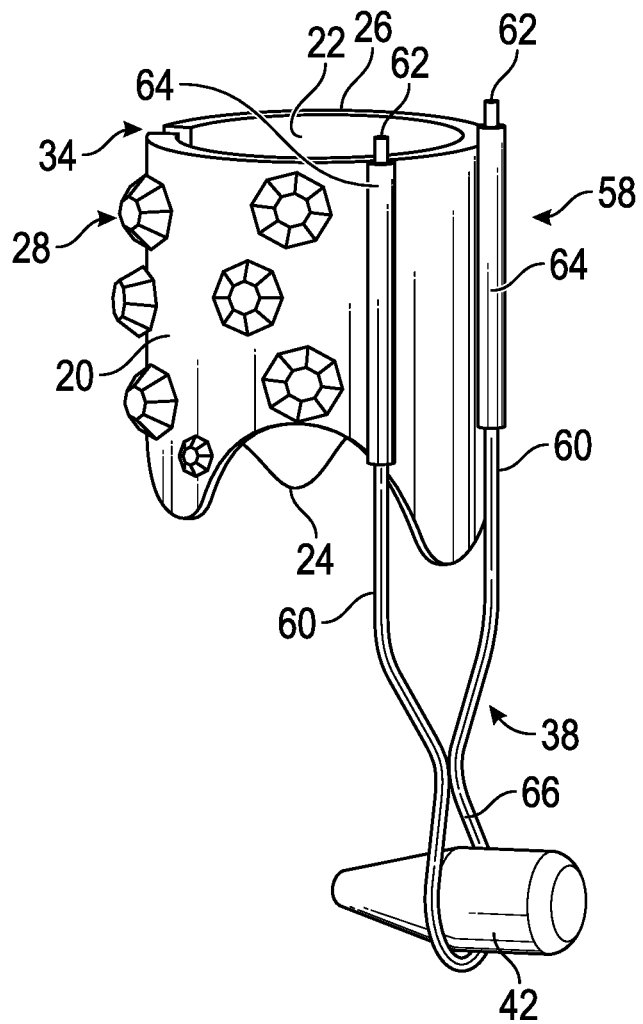
FIG. 3 is a top perspective view of an embodiment of the disclosure.
Figure 4:
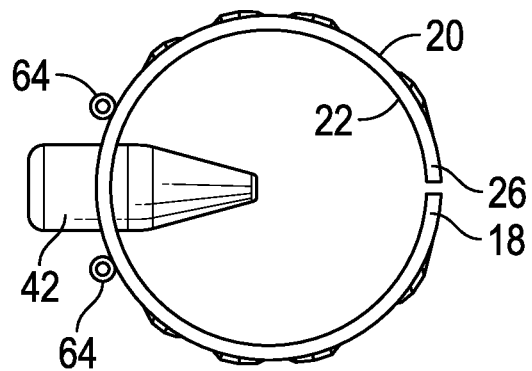
FIG. 4 is a top view of an embodiment of the disclosure.
Figure 5:
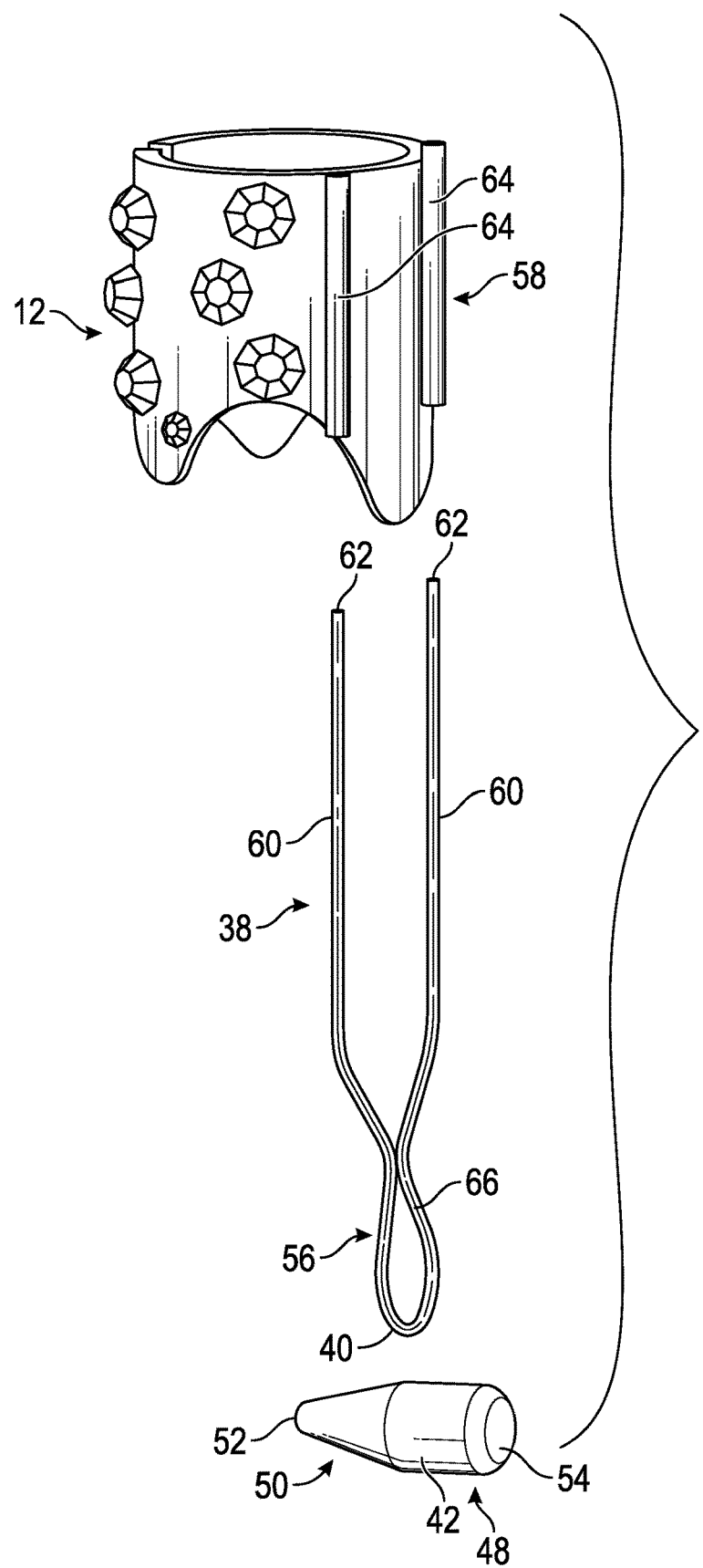
FIG. 5 is an exploded view of an embodiment of the disclosure.
Figure 6:
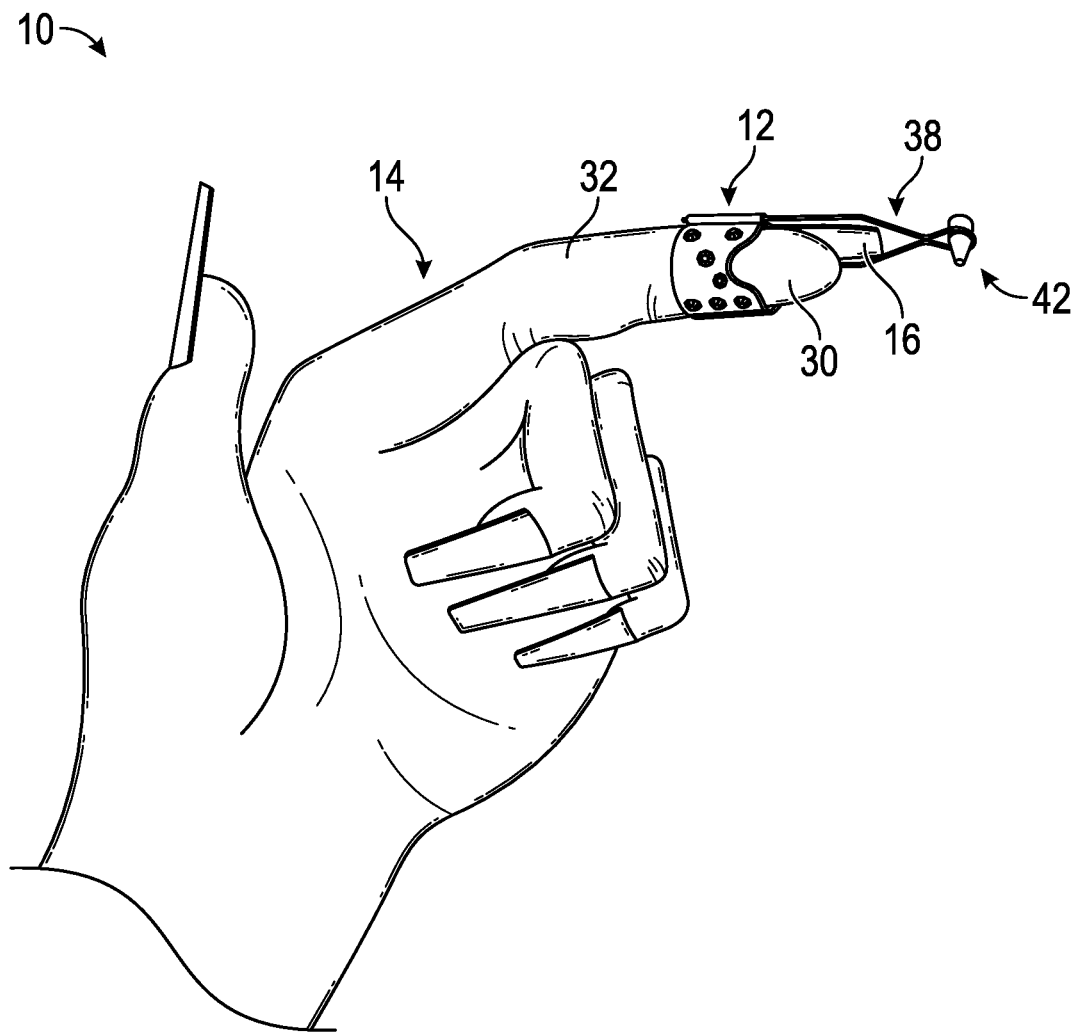
FIG. 6 is an in-use view of an embodiment of the disclosure.
Figure 7:
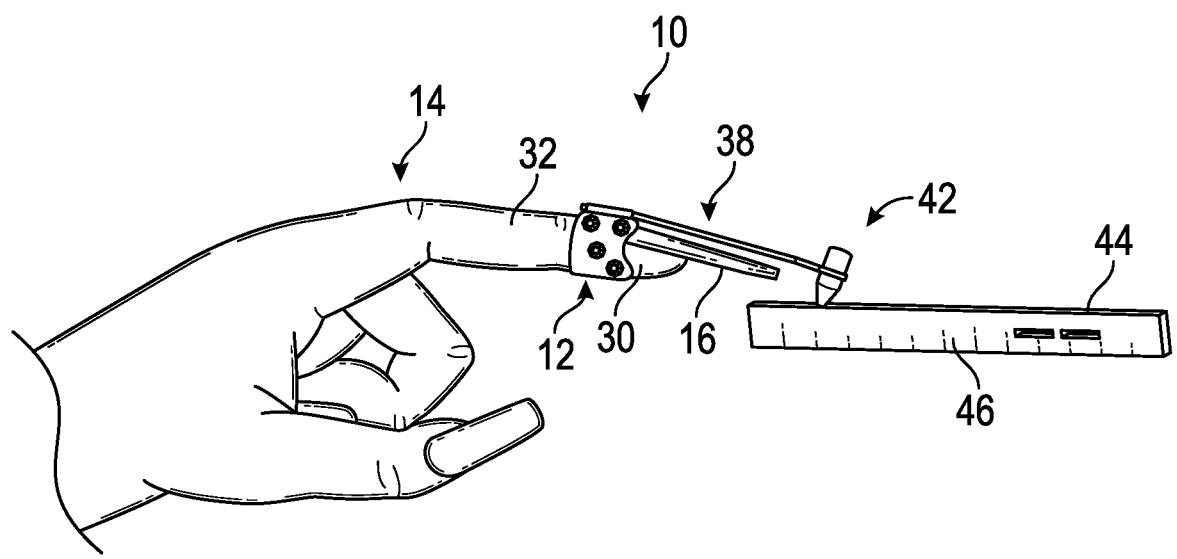
FIG. 7 is an in-use view of an embodiment of the disclosure.

With reference now to the drawings, and in particular to FIGS. 1 through 7 thereof, a new touch screen actuator embodying the principles and concepts of an embodiment of the disclosure and generally designated by the reference numeral 10 will be described.

As best illustrated in FIGS. 1 through 7, the touch screen actuation assist assembly 10 generally comprises a mount 12 configured for removable engagement to the finger 14 adjacent to a free end of the finger 14, wherein the free end may have an elongated fingernail 16 extending outwardly therefrom. The mount 12 includes a perimeter wall 18 having an exterior surface 20, an interior surface 22, an outer edge 24, and an inner edge 26. The outer 24 and inner 26 edges define openings for extending the finger 14 through. The exterior surface 20 of the mount 12 may have decorative elements 28 thereon such as, including, typically a plurality of decorative crystals attached to the exterior surface 20. The decorative elements 28 are may be customizable by a person to enhance the appearance of the mount 12.

The interior surface 22 is concavely arcuate to extend around and frictionally engage the finger 14. The mount 12 frictionally engages with a distal phalanx 30 or a middle phalanx 32 of the finger 14. The outer edge 24 is directed outwardly away from the finger 14 when the mount 12 is on the finger 14. The perimeter wall 18 has a break 34 therein extending through the inner 26 and outer 24 edges to define a pair of parallel edges 36. The mount 12 is bendable to allow a distance between the pair of parallel edges 36 to be selectively adjustable. The distance between the pair of parallel edges 36 may be extended to insert a larger finger 14 through the mount 12.

An elongated member 38 is coupled to the mount 12 adjacent to the outer edge 24 and extends away from the outer edge 24. The elongated member 38 has a distal end 40 relative to the mount 12. A stylus 42 is coupled to the elongated member 38 adjacent to the distal end 40. The stylus 42 comprises a material configured to actuate a touch screen 44 of a personal electronic device 46. The material typically is a capacitive rubber configured to actuate the touch screen 44 by physically pressing against the touch screen 44. The stylus 42 includes a cylindrical portion 48 and a conical portion 50. The conical portion 50 terminates in a tip end 52. The cylindrical portion 48 typically terminates in a rounded end 54. The elongated member 38 includes a receiver 56, wherein the stylus 42 is releasably engaged by the receiver 56.

The mount 12 includes a coupler 58 releasably coupling the elongated member 38 to the perimeter wall 18. The elongated member 38 comprises a pair of arms 60 spaced from each other. Each of the arms 60 has an engagement end 62 removably received by the coupler 58. The coupler 58 comprises a pair of sleeves 64 attached to the perimeter wall 18 and orientated parallel to each other. Each of the sleeves 64 has an opening positioned adjacent to the outer edge 24. Each of the sleeves 64 removably receives the engagement end 62 of one of the arms 60.

The pair of arms 60 are attached to each other to define the distal end 40 of the elongated member 38. The arms 60 are formed into the receiver 56 adjacent to the distal end 40. The receiver 56 comprises a broken loop 66 of resiliently bendable material. The stylus 42 is frictionally held through the broken loop 66, wherein the conical portion 50 is positioned on a first side of the receiver 56 and the cylindrical portion 48 is positioned a second side of the receiver 56. The arms 60 are removable from the coupler 58 to flip the elongated member 38, such that the tip end 52 and the rounded end 54 are configured to be selectively engageable with the touch screen 44 when the elongated member 38 is coupled to the mount 12.

In use, the finger 14 is inserted through the opening of the mount 12 and the interior surface 22 of the mount 12 frictionally engages with the finger 14. The coupler 58 of the mount 12 couples the elongated member 38 to the perimeter wall 18. The stylus 42 coupled to the elongated member 38 is configured to actuate the touch screen 44 of the personal electronic device 46. The elongated member 38 is configured to extend over the elongated fingernail 16 of the finger 14, wherein the stylus 42 is configured to be positioned beyond a point of the elongated fingernail 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A touch screen actuation assist assembly configured to be worn on a finger of a person, said touch screen actuation assist assembly comprising:
   a mount configured for removable engagement to the finger adjacent to a free end of the finger, said mount including a perimeter wall, said perimeter wall having an exterior surface, an interior surface, an outer edge, and an inner edge, said outer and inner edges defining openings for extending the finger through;
   an elongated member being coupled to said mount adjacent to said outer edge and extending away from said outer edge, said elongated member having a distal end relative to said mount;
   a stylus being coupled to said elongated member adjacent to said distal end, said stylus comprising a material configured to actuate a touch screen of a personal electronic device;
   said mount including a coupler, said coupler releasably coupling said elongated member to said perimeter wall; and
   said elongated member comprising a pair of arms, each arm extending in a longitudinal direction with respect to the elongated member, said arms being laterally spaced from each other with respect to the elongated member, each of said arms having an engagement end removably received by said coupler, said coupler comprising a pair of sleeves being attached to said perimeter wall and being orientated parallel to each other, each of said sleeves having an open positioned adjacent to said outer edge each of said sleeves removably receiving said engagement end of one of said arms.

2. The touch screen actuation assist assembly of claim 1, wherein said interior surface is concavely arcuate to extend around and frictionally engage the finger, the outer edge being directed outwardly away from the finger when the mount is on the finger, said perimeter wall having a break therein extending through said inner and outer edges to define a pair of parallel edges, said mount being bendable to allow a distance between said pair of parallel edges to be selectively adjustable.

3. The touch screen actuation assist assembly of claim 1, wherein said stylus includes a cylindrical portion and a conical portion, said conical portion terminating in a tip end.

4. The touch screen actuation assist assembly of claim 1, wherein said elongated member includes a receiver, said stylus being releasably engaged by said receiver.

5. The touch screen actuation assist of claim 4, wherein said pair of arms are attached to each other to define the distal end of the elongated member, said arms being formed into the receiver adjacent to the distal end, said receiver comprising a broken loop of resiliently bendable material.

6. A touch screen actuation assist assembly configured to be worn on a finger of a person, said touch screen actuation assist assembly comprising:
   a mount configured for removable engagement to the finger adjacent to a free end of the finger, said mount including a perimeter wall, said perimeter wall having an exterior surface, an interior surface, an outer edge, and an inner edge, said outer and inner edges defining openings for extending the finger through, said interior surface being concavely arcuate to extend around and frictionally engage the finger, the outer edge being directed outwardly away from the finger when the mount is on the finger, said perimeter wall having a break therein extending through said inner and outer edges to define a pair of parallel edges, said mount being bendable to allow a distance between said pair of parallel edges to be selectively adjustable;

an elongated member being coupled to said mount adjacent to said outer edge and extending away from said outer edge, said elongated member having a distal end relative to said mount;

a stylus being coupled to said elongated member adjacent to said distal end, said stylus comprising a material configured to actuate a touch screen of a personal electronic device, said stylus including a cylindrical portion and a conical portion, said conical portion terminating in a tip end;

said elongated member including a receiver, said stylus being releasably engaged by said receiver;

said mount including a coupler, said coupler releasably coupling said elongated member to said perimeter wall;

said elongated member comprising a pair of arms, each arm extending in a longitudinal direction with respect to the elongated members, said arms being laterally spaced from each other with respect to the elongated member, each of said arms having an engagement end removably received by said coupler, said coupler comprising a pair of sleeves being attached to said perimeter wall and being orientated parallel to each other, each of said sleeves having an open positioned adjacent to said outer edge, each of said sleeves removably receiving said engagement end of one of said arms; and said pair of arms being attached to each other to define the distal end of the elongated member, said arms being formed into the receiver adjacent to the distal end, said receiver comprising a broken loop of resiliently bendable material.

* * * * *